United States Patent [19]
Okawa

[11] Patent Number: 5,933,810
[45] Date of Patent: Aug. 3, 1999

[54] RESERVATION MANAGEMENT APPARATUS AND METHOD FOR MAKING ARRANGEMENTS ACCORDING TO DEGREES OF IMPORTANCE OF RESERVATIONS

[75] Inventor: Masaya Okawa, Shizuoka, Japan

[73] Assignee: Fujitsu Limited, Kawasaki, Japan

[21] Appl. No.: 08/602,349

[22] Filed: Feb. 16, 1996

[30] Foreign Application Priority Data

Apr. 24, 1995 [JP] Japan .................................. 7-098787

[51] Int. Cl.[6] ........................................................ G06F 17/60
[52] U.S. Cl. ..................................................... 705/5; 705/6
[58] Field of Search .................................. 705/5, 6, 8, 9

[56] References Cited

U.S. PATENT DOCUMENTS

| | | | |
|---|---|---|---|
| 4,807,155 | 2/1989 | Cree | 364/518 |
| 4,817,018 | 3/1989 | Cree | 364/518 |
| 4,845,625 | 7/1989 | Stannard | 364/407 |
| 5,050,077 | 9/1991 | Vincent | 364/401 |
| 5,070,470 | 12/1991 | Scully | 364/705.08 |
| 5,303,145 | 4/1994 | Griffin | 364/401 |
| 5,319,781 | 6/1994 | Syswerda | 395/650 |
| 5,323,314 | 6/1994 | Baber | 364/401 |
| 5,422,809 | 6/1995 | Griffin | 364/407 |
| 5,506,966 | 4/1996 | Ban | 395/250 |

FOREIGN PATENT DOCUMENTS

| | | |
|---|---|---|
| 0280893 A2 | 9/1988 | European Pat. Off. . |
| 0647903 A1 | 4/1995 | European Pat. Off. . |
| 63-262754 | 10/1988 | Japan ............................... G06F 15/21 |
| 4-151766 | 5/1992 | Japan ............................... G06F 15/26 |
| 1295627 | 11/1972 | United Kingdom . |

OTHER PUBLICATIONS

PTO 98/3927, Translation of Yamamoto application 63–262754, Aug. 1998.
PTO 98–3932, Translation of Suzuki application 4–151766, Aug. 1998.
English language Abstract of Japanese Patent No. 6–187351, issue date: Jul. 8, 1994.
English language Abstract of Japanese Patent No. 4–151766, issue date: May 25, 1992.
English language Abstract of Japanese Patent No. 63–262754, issue date: Oct. 31, 1988.

*Primary Examiner*—Eric W. Stamber
*Assistant Examiner*—Hani M. Kazimi
*Attorney, Agent, or Firm*—Staas & Halsey, LLP

[57] ABSTRACT

A reservation management apparatus automatically determining importance degrees of reservations such as a resource, a scheduling, etc. This apparatus allows an arrangement of duplicate reservations, using the importance degrees, and a determination of reservation acceptance. An entry unit functions for entering the requirements of the first reservation, a storage unit stores information of the second reservation previously entered and registered, a detection unit determines whether or not there is a duplication between the first reservation requirement and the second reservation information, an importance degree determination unit calculates the importance degrees of the first and second reservations and a plurality of items for each of the reservations, an arrangement unit arranges the first reservation as requested, cancels or changes the duplicate second reservation, and refuses to arrange the first reservation, and an output unit outputs results of a determination.

14 Claims, 10 Drawing Sheets

| | ITEM | METHOD OF CALCULATING IMPORTANCE DEGREE | COEFFICIENT |
|---|---|---|---|
| (a) | CONTENTS OF RESERVATION | SEARCHING CONTENTS OF RESERVATION FOR KEYWORD. USING VALUE OF HIGHEST IMPORTANCE DEGREE | 1.0 |
| (b) | EXECUTION DATE | 1/NUMBER OF DAYS FROM CALCULATION DATE TO EXECUTION DATE | 1.0 |
| (c) | KEY PERSON | TOTAL OF INDIVIDUAL IMPORTANCE DEGREES OF KEY PERSONS. INDIVIDUAL IMPORTANCE DEGREE IS CALCULATED ACCORDING TO MANAGERIAL POSITION IN INDIVIDUAL INFORMATION TABLE AND CONVERSION TABLE OF MANAGERIAL POSITIONS/DEGREES OF IMPORTANCE | 0.6 |
| (d) | ATTENDEES | TOTAL OF THE INDIVIDUAL IMPORTANCE DEGREES OF ALL ATTENDANTEES. METHOD OF CALCULATING IMPORTANCE DEGREES IS BASED ON (c) | 0.2 |
| (e) | NUMBER OF RESERVATION CHANGES | NUMBER OF TIMES RESERVATION IS CHANGED | 0.1 |
| (f) | RESERVATION DATE AND TIME | DIFFERENCE BETWEEN EXECUTION DATE AND CALCULATION DATE OF RESERVATION REQUIREMENT PROCESSING | 0.1 |

FIG. 3

| KEYWORD | IMPORTANCE DEGREE |
|---|---|
| BOARD MEETING | 80 |
| GENERAL MANAGER'S MEETING | 30 |
| SECTION CHIEF'S MEETING | 10 |
| UNION MEETING | 25 |

FIG. 4

| USER NAME | MANAGERIAL POSITION |
|---|---|
| ISOBE | GENERAL MANAGER |
| EJIMA | SECTION CHIEF |
| MOCHIZUKI | NONE |
| OKAWA | NONE |

FIG. 5

| MANAGERIAL POSITION | IMPORTANCE DEGREE |
|---|---|
| GENERAL MANAGER | 10 |
| SECTION CHIEF | 5 |
| VISITOR | 2 |
| OTHERS | 1 |

FIG. 6

| ENTRY ITEM | CONTENTS |
|---|---|
| CONTENTS OF RESERVATION | FOR HOLDING 1-1 SECTION MEETING |
| ALLOWABLE DATE RANGE | JAN. 21 TO JAN. 24 |
| ATTENDEES | 32 PEOPLE INCLUDING EJIMA AND MOCHIZUKI |
| KEY PERSON | EJIMA |
| RESERVATION REQUEST DATE | JAN. 20 |

FIG. 7

| | CONTENTS OF RESERVATION | ALLOWABLE DATE RANGE | ATTENDEES | KEY PERSON | RESERVATION REQUEST DATE | NUMBER OF RESERVATION CHANGES |
|---|---|---|---|---|---|---|
| JAN. 20 | | | | | | |
| JAN. 21 | FOR HOLDING 1-1 SECTION MEETING | JAN. 21 TO JAN. 24 | 32 PEOPLE INCLUDING EJIMA AND MOCHIZUKI | EJIMA | JAN. 20 | 0 |
| JAN. 22 | | | | | | |
| JAN. 23 | | | | | | |
| JAN. 24 | | | | | | |

FIG. 9

RESERVATION MANAGEMENT APPARATUS AND METHOD FOR MAKING ARRANGEMENTS ACCORDING TO DEGREES OF IMPORTANCE OF RESERVATIONS

BACKGROUND OF THE INVENTION

1. Field of the Invention

The present invention relates to a reservation management apparatus and a method for arranging duplicate reservations for the same time in an information processing system for managing a plurality of reservations.

2. Description of the Related Art

In conventional reservation management systems, if the duplicate reservations for the same time are made, a person who knows the respective importance of the duplicate reservations determines an order of precedence, in most cases. There are other well-known methods such as the one disclosed in TOKKAISHO:63-262754, for determining an order of precedence according to a priority of simultaneously-entered reservations when the reservations are entered in the reservation management system, and the one disclosed in TOKKAIHEI:4-151766, for controlling an order of precedence according to a priority assigned to user IDs.

There are, however, the following problems in the conventional reservation management systems.

The method where the person who knows the respective importance of the duplicate reservations is based on the assumption that such a person actually exists. If such a person does not exist, it is impossible to make a correct determination of the priority.

In the method for assigning a priority to reservations when users make reservations (TOKKAISHO:63-262754), all persons who perform reservation operations using the reservation management systems should have knowledge of the determination standards for assigning a priority to the reservations. This means the users of the systems are limited to persons who have knowledge of the determination standards. Since a person should determine the priority of the reservations when performing the reservation operations in this method, the reservation operations become complicated, and errors can occur as a result. If there is a reservation with an incorrect priority, the reservation management systems cannot properly perform priority control.

In the method for controlling the priority according to the priority assigned to the user IDs (TOKKAIHEI:4-151766), the priority of the reservations is assigned according to an ID of a person who makes a reservation, regardless of the contents of the reservation. Accordingly, the priority of the reservation of the user who has an ID with a low priority, is always determined as low, however important the reservation is. That is, priority control may sometimes be performed contrary to the actual degree of importance. Furthermore, only the users themselves should perform the reservation operations, other persons cannot perform the operations for them.

SUMMARY OF THE INVENTION

An object of the present invention is to provide a reservation management apparatus and a method for determining whether to accept requirements of a reservation by automatically calculating a degree of importance of the reservation, in an information processing system that manages a plurality of reservations for matters requiring reservations.

According to this invention, degrees of importance of reservations such as a resource, scheduling, etc. are automatically determined so that arrangement can be made using the results of the determinations, when duplicate reservations are made. As a result, the burden on the users who make reservations can be alleviated, and errors caused by human determinations can be prevented. Additionally, this invention greatly improves the efficiency of reservation management processing.

The reservation management apparatus comprises an entry unit, a detection unit, a storage unit, an importance degree determination unit, an arrangement unit, and an output unit.

The entry unit is intended to enter requirements of the first reservation, and the storage unit is intended to store information of the second reservation that was previously registered.

The detection unit is intended to determine whether or not there is a duplication between the first and the second reservations, according to the requirements of the first reservation and the information of the second reservation stored in the storage unit, when the requirements of the first reservation are entered.

The importance degree determination unit is intended to calculate a degree of importance of the first reservation according to the requirements of the first reservation, and the degree of importance of the second reservation according to the information of the second reservation.

The arrangement unit is intended to determine whether to accept the requirements of the first reservation, by making a comparison between the degree of importance of the first reservation and that of the second reservation, which are calculated by the importance degree determination unit, when a duplication between the first reservation and the second reservation is detected by the detection unit.

The output unit is intended to output results of determining whether to accept the requirements of the first reservation by the arrangement unit.

The entry unit corresponds to an entry device such as a keyboard, a transmission/reception portion, etc. The storage unit corresponds to a memory. The output unit corresponds to a CRT (cathode ray tube), an output device such as the transmission/reception portion, etc. The detection unit, the importance degree determination unit, and the arrangement unit correspond to a CPU (Central Processing Unit).

The entry unit enters the requirements of the first reservation, which are the requirements of a new reservation. The requirements of the first reservation include information of the first reservation such as a purpose of use, a user name, etc. The storage unit stores the information of the second reservation, which is a prior reservation previously entered and registered.

The detection unit determines whether or not a date and time of the first reservation and that of the second reservation are duplicate. If any duplication is found, the importance degree determination unit calculates the degrees of importance of the first and the second reservations. At that time, the degree of importance of each reservation is automatically calculated according to a predetermined calculation method. Furthermore, after calculating degrees of importance of a plurality of items for each reservation, a total of the degrees of importance may also be obtained.

The arrangement unit makes a comparison between the degree of importance of the first reservation and that of the second reservation. If the former is higher than the latter, the first reservation is arranged as required. The second reservation which is duplicate with the first reservation is changed to a different date and time or assigned a lower priority. If the second reservation cannot be changed, it is canceled. If the degree of importance of the first reservation is lower, the arrangement unit refuses to arrange the first reservation. Results of a determination made by the arrangement unit are externally output from the output unit, and informed to a person who requests the reservation.

Thus, the detection unit, the importance degree determination unit, and the arrangement unit automatically arrange the duplicate reservations. Accordingly, persons such as the one who requests the reservation, the one who performs the reservation operations, etc. do not need to determine the degrees of importance of these two reservations. Accordingly, reservation management can efficiently be performed.

BRIEF DESCRIPTION OF THE DRAWINGS

The present invention will be more apparent from the following detailed description in conjunction with the accompanying drawings, in which:

FIG. 3 is a table showing a method of calculating degrees of importance and related coefficients;

FIG. 4 shows a keyword table;

FIG. 5 shows an individual information table;

FIG. 6 shows a conversion table of managerial positions/degrees of importance;

FIG. 7 is a table showing an entry example of requirements of a reservation;

FIG. 9 shows a reservation table; and

DESCRIPTION OF THE PREFERRED EMBODIMENT

Figure 1:
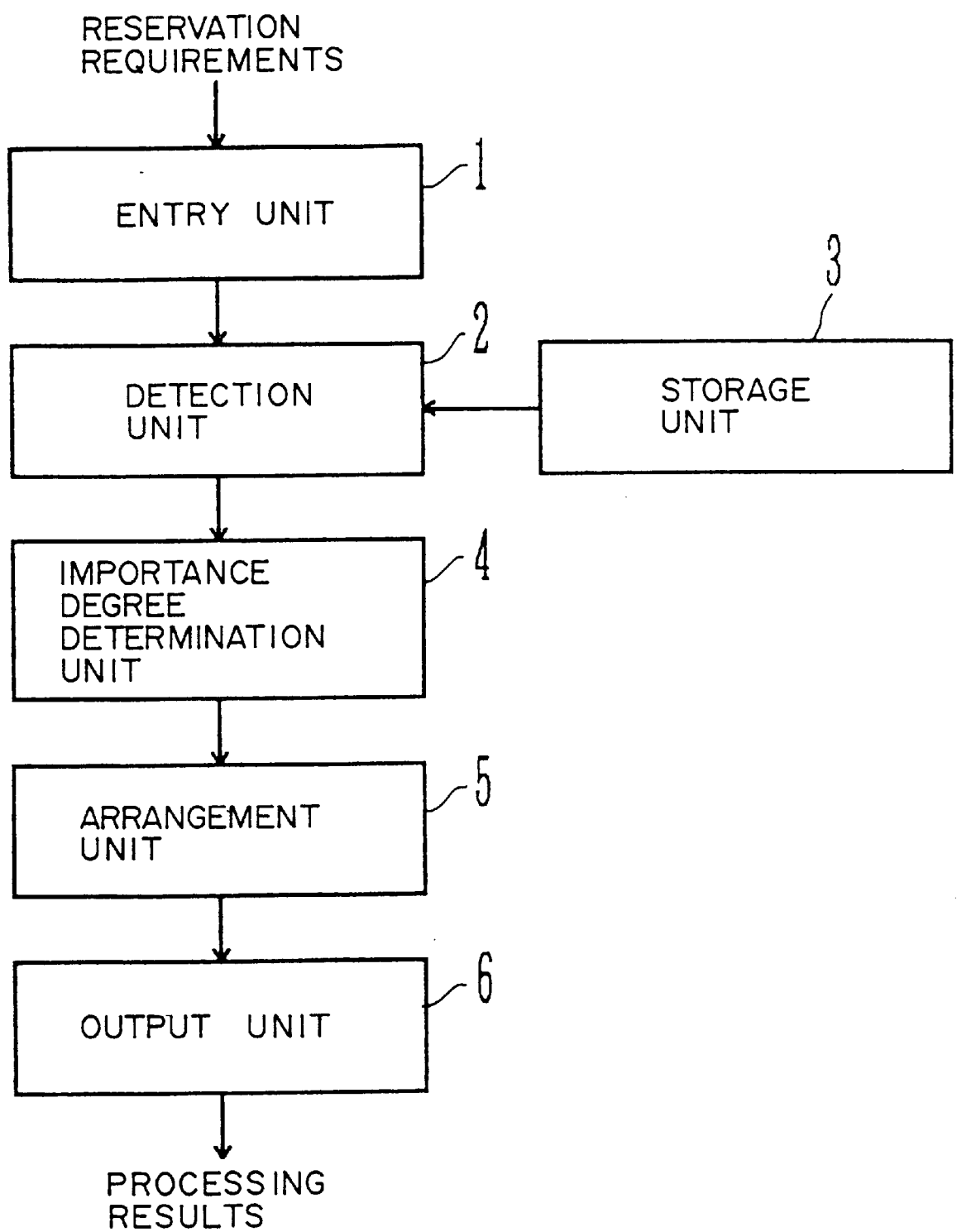
FIG. 1 is a block diagram showing a principle of the present invention.

Provided below is a detailed explanation of the embodiment according to this invention, referring to the drawings.

FIG. 1 is a block diagram showing the principle of the reservation management apparatus according to this invention. The reservation management apparatus shown in FIG. 1 comprises an entry unit 1, a detection unit 2, a storage unit 3, an importance degree determination unit 4, an arrangement unit 5, and an output unit 6.

Requirements of the first reservation are entered in the entry unit 1, and the storage unit 3 stores information of the second reservation which was previously registered.

The detection unit 2 determines whether or not there is a duplication between the first and the second reservations, according to the information of the second reservation stored in the storage unit 3 and the requirements of the first reservation, when the requirements of the first reservation are entered.

The importance degree determination unit 4 calculates the degree of importance of the first reservation according to the requirements of the first reservation, and the degree of importance of the second reservation according to the information of the second reservation.

The arrangement unit 5 determines whether to accept the requirements of the first reservation, based on a comparison between the degree of importance of the first reservation and that of the second reservation made by the importance degree determination unit 4, when the detection unit 2 detects any duplication between the first reservation and the second reservation.

The output unit 6 outputs results generated by the processing where the arrangement unit 5 determines whether to accept the requirements of the first reservation.

Figure 2:
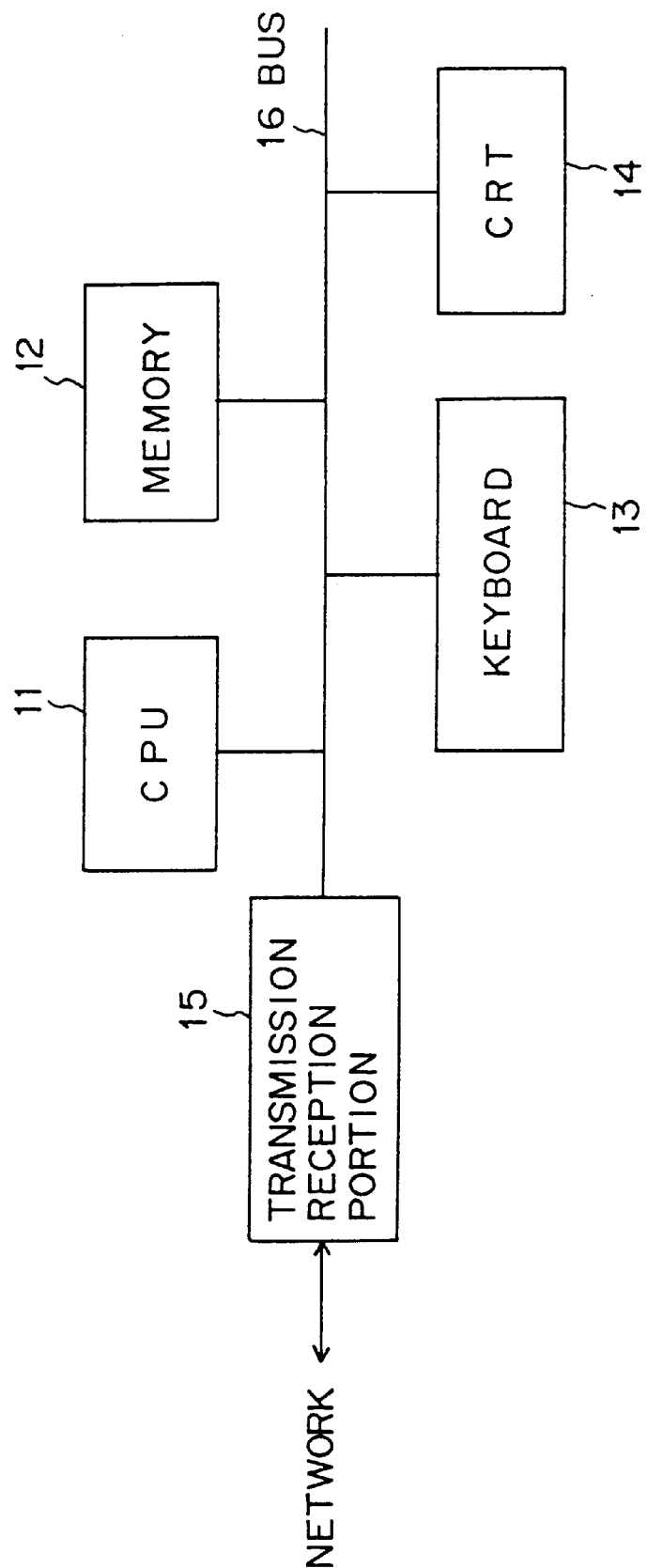
FIG. 2 is a block diagram showing a configuration of a reservation management apparatus in an embodiment.

In FIG. 1, the entry unit 1 corresponds to an entry device such as a keyboard 13, a transmission/reception portion 15, etc., shown in FIG. 2; the storage unit 3 corresponds to a memory 12; the output unit 6 corresponds to an output device such as a CRT (cathode ray tube) 14, the transmission/reception portion 15, etc.; The detection unit 2, the importance degree determination unit 4, and the arrangement unit 5 correspond to a CPU (central processing unit) 11.

FIG. 2 is a block diagram showing a configuration of the reservation management apparatus in the embodiment. The reservation management apparatus shown in FIG. 2 comprises the CPU 11, the memory 12, the keyboard 13, the CRT 14, and the transmission/reception part 15, all of which are connected via a bus 16. The keyboard 13 is used to make entries such as the entries of reservation requirements, etc. Results of reservation processing performed for entered requirements of the reservation are displayed on the CRT 14. Other entry devices such as a mouse, etc. may be used instead of the keyboard 13. Other output devices such as a liquid crystal display device, a printer, etc. may be used instead of the CRT 14. The memory 12 pre-stores standards for determining degrees of importance of reservations according to a plurality of reservation items.

The CPU 11 automatically determines the degree of importance of a reservation according to the entered requirements of the reservation and the standards for determining the degrees of importance stored in the memory 12. Thus, users of the reservation management apparatus do not need to remember the standards for determining the priority of reservations, or to examine the priority of reservations when requesting reservations. Therefore, the operations performed by the users can be simplified, and errors when assigning the priority of reservations by the users can be reduced. The requirements of the reservation accepted by a determination are stored in the memory 12.

The transmission/reception portion 15 exchanges signals between itself and a network to which terminals of a plurality of users may be connected. When a prior reservation previously made by a user is changed or canceled to give a higher priority to a reservation with a higher degree of importance, it can be informed to the user who made the prior reservation using methods such as electronic mail correspondence, etc.

As determination standards of automatically determining the degrees of importance, the following (a) through (f) may be used. Each of the standards can be used on its own, or in combination with any of other standards.

(a) Determining the Degree of Importance According to a Description of Reservation Contents Keywords for determining the degree of importance of a reservation, and each degree of importance of the keywords are set in the memory 12. A user who requests the reservation (person who makes the reservation) describes the contents of the reservation, which is a purpose of use of the subject of the reservation. The CPU 11 searches the contents of the reservation for the keywords so as to determine the degree of importance of the reservation according to the degrees of importance of the searched keywords.

(b) Determining the Degree of Importance According to a Reservation Date and Time of Execution.

A person who makes a reservation sets a range of dates and times during which the reservation is allowable, when making the reservation. If the dates and times during which the reservation is allowable are included in requirements of the reservation, the CPU 11 assigns a higher degree of importance to the reservation as the final date and time (the date and time of execution) draws nearer.

(c) Determining the Degree of Importance According to a Key Person.

Individual information about users is set in the memory 12. Based on the managerial positions of the users included in the individual information, the CPU 11 determines a priority of reservations for each of the users. The person who makes the reservation specifies an attendee essential for executing the reservation among all attendees, as a key person, when making the reservation. The more the reservation includes key persons with high priorities, the higher the degree of importance of the reservation set by the CPU 11 becomes.

(d) Determining the Degree of Importance According to the Number of Attendees

Since a reservation including many attendees has a greater effect if changed, the degree of importance of the reservation is set high. In a similar manner as in (c), the more the reservation includes attendees with high priorities, the higher the degree of importance the reservation is set to.

(e) Determining the Degree of Importance According to the Number of Reservation Changes As the number of times of changing a reservation to different dates and times becomes larger due to the precedence of another reservation, a higher degree of importance is given to the reservation.

(f) Determining the Importance Degree According to a Date and Time of a Reservation When importance degrees of other standards are the same, the earlier a reservation date and time is, the higher priority is given to the reservation, in order to prioritize a prior reservation.

The reservation management apparatus of this embodiment is targeted for reservations which are once set and can be rescheduled flexibly based on the importance degree, and for resources requiring reservations. Such limited as meeting rooms, cars, equipment, etc. possessed by companies or associations, or public facilities, can be cited. This invention can also be applied to arrangements for a personal scheduling such as a business trip, an appointment, etc., and a job scheduling performed by a computer.

Explained below is reservation management of a meeting room used by a plurality of users in one organization. In this case, if two or more reservations are duplicated for the meeting room, the reservation management apparatus automatically removes the duplication. Assume that the following initial settings are made in the reservation management apparatus, so as to determine the degrees of importance of the reservations:

1. The degrees of importance of the reservations are determined in consideration of all the degrees of importance of the above determination standards (a) through (f).
2. Values of the degrees of importance are calculated according to a calculation method shown in FIG. 3, for the above determination standards (a) through (f).
3. Each degree of importance according to each of the determination standards (a) through (f) is multiplied by a corresponding coefficient (ratio) shown in FIG. 3, and the total of the multiplied results is recognized as the degree of importance of the reservation. A higher priority is assigned to the reservation as the total of the multiplied results becomes larger.

FIG. 3 is a table showing a method of calculating the degrees of importance and the coefficients for the determination standards (a) through (f). FIGS. 4, 5, and 6 are embodiments of a keyword table, an individual information table, and a conversion table of managerial positions/ degrees of importance, respectively. The method of calculating the degrees of importance, the coefficients, and the tables are pre-stored in the memory 12.

For the contents of the reservation described in (a) of FIG. 3, the CPU 11 initially searches for the keywords from a purpose of using the meeting room as described by the user. The CPU 11 then references the keyword table shown in FIG. 4, and obtains the largest value among the degrees of importance of the keywords included in the contents of the reservation (the purposes of use).

In the keyword table shown in FIG. 4, four types of meetings such as a board meeting, a general manager's meeting, a section chief's meeting and a union meeting are registered as the keywords. The degrees of importance of these four keywords are 80, 30, 10, and 25 respectively. For example, if the keyword "the board meeting" is included in the purpose of use, the degree of importance of the reservation becomes the highest since the degree of importance of this keyword is the highest of 80.

For the execution date and time described in (b) of FIG. 3, an inverse number of the number of days from the day of calculating the importance degree until the day of executing the reservation is defined to be the importance degree.

For the key person described in (c) of FIG. 3, a total of individual degrees of importance of attendees essential for holding the meeting is calculated. The individual degrees of importance of attendees are obtained by referencing the individual information table shown in FIG. 5 and the conversion table of managerial positions/degrees of importance shown in FIG. 6.

The individual information table shown in FIG. 5 includes the user names of Isobe, Ejima, Mochizuki, and Okawa, whose managerial positions are the general manager, the section chief, none, and none, respectively. The conversion table of managerial positions/degrees of importance registers the general manager, the section chief, a visitor, and others, as the managerial positions, whose degrees of importance are 10, 5, 2, and 1, respectively. For example, in the case of obtaining the degree of importance of Isobe, the CPU 11 first searches the individual information table with the name of Isobe as a search key. As a result, "the general manager", which is the managerial position of Isobe, is obtained as the next search key. Then, the CPU 11 searches the conversion table of managerial positions/degrees of importance with "the general manager" as the search key. The value "10" of the degree of importance corresponding to "the general manager" is obtained.

For the attendees described in (d) of FIG. 3, a total of the individual degrees of importance of all of the attendees at the reserved meeting is obtained. Each degree of importance of each attendee is obtained according to the individual information table shown in FIG. 5 and the conversion table of managerial positions/degrees of importance shown in FIG. 6, in the similar manner as in (c) of FIG. 3.

For the number of reservation changes described in (e) of FIG. 3, the number of changes made to the registered reservation date and time after the reservation is accepted and registered in the memory 12 is defined as the degree of importance, so as to prioritize the reservation with a higher degree of importance. By way of example, if the number of changes made to a newly-entered reservation is 0, its degree of importance is 0.

For the reservation date and time described in (f) of FIG. 3, the difference between the execution date of a reservation requirement processing and the calculation date is defined as the degree of importance. The execution date of the reservation requirement processing means a date when requirements of the reservation are initially entered. Accordingly, its degree of importance is 0 when the requirements of a newly-entered reservation are processed.

The values of the coefficients multiplied with the degrees of importance of the determination standards (a) through (f) of FIG. 3 are respectively 1.0, 1.0, 0.6, 0,2, 0, 1 and 0.1. These coefficients may be changed to appropriate values depending on need.

FIG. 7 is a table showing an entry example of requirements of a reservation when a user requests the reservation. The purpose of use of the reservation is to hold a section meeting of 1—1 Section. The allowable date range is from January 21st till January 24th, and the execution date is January 24th. The attendees are 30 people including Ejima, and Mochizuki, and the key person among them is Ejima, the section chief. The date when the requirements of the reservation are entered into the reservation management unit is January 20th.

Figure 8:
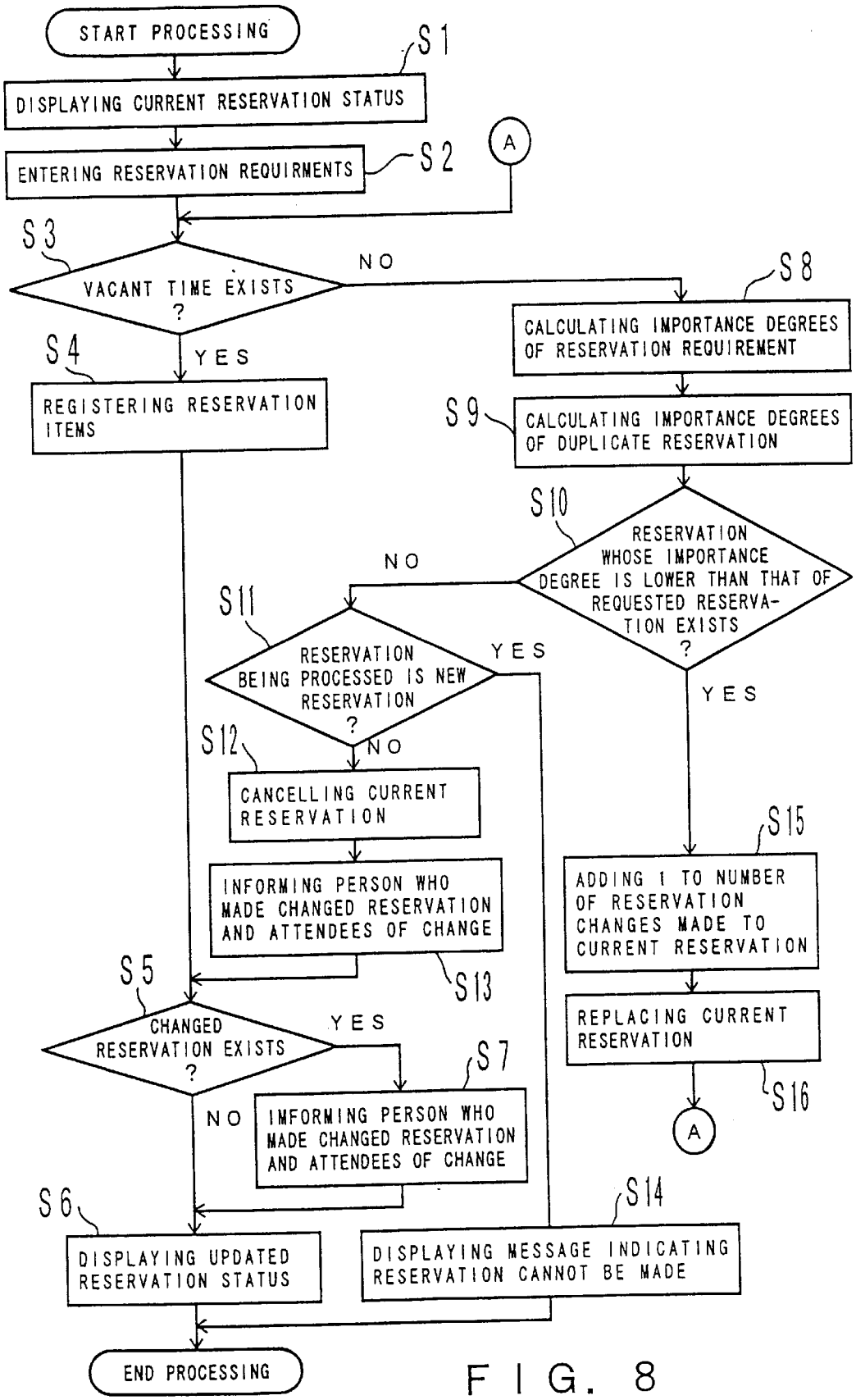
FIG. 8 is a flowchart showing a reservation processing.

FIG. 8 is a flowchart of the reservation processing performed by the reservation management apparatus when the requirements of a reservation are entered. Once the reservation processing is started, the CPU 11 references a reservation table stored in the memory 12, and displays the current reservation status on the CRT 14 in step S1. The reservation table stores the contents of entry items of reservations previously accepted by the reservation management apparatus. Then in step S2, a user enters each of the requirements of a new reservation into the reservation management apparatus via the keyboard 13. In addition to the entry method via the keyboard, an entry method using a mouse, a voice entry method via a telephone or a microphone, a character entry method by reading a request form of the reservation received via fax may be used. By using any of these methods, the content of each entry item shown in FIG. 7, for example, is entered.

The CPU 11 then determines whether or not vacant time exists for the meeting room in the allowable date range included in the requirements of the reservation entered in step S3. If vacant time exists, the requirements of the reservation are accepted in step S4 and the contents of the entry items are registered in the reservation table in step S4. Then in step S5, whether or not there is a current reservation to which any change is made is determined. If there is no such reservation, updated reservation status including the reservation accepted at this time is displayed on the CRT 14 in step S6 and the processing is terminated.

FIG. 9 shows an example of a reservation table where the requirements of the reservation shown in FIG. 7 are registered. This figure assumes that there are no prior reservations in the allowable date range from January 21st through 24th described in the requirements of the reservation, and that the meeting room is unreserved (step S3, YES). In this case, on January 21st, which is the nearest date to the requested date in the allowable date range, the reservation is arranged, and the contents of the reservation, the allowable date range, the number of attendees, the key person, the reservation request date, and the number of reservation changes, are registered in the reservation table in step S4. Since the reservation is arranged at the time of the reservation request in this case, the number of reservation changes is 0. On the CRT 14, data included in the reservation table is displayed as reservation status in step S6.

If vacant time does not exist in step S3, an arrangement is required to be made between the current reservation (duplicate reservation) which is duplicated with the requested reservation for the same time, and the requested reservation. In this case, the CPU 11 calculates the degrees of importance of the requirements of the requested reservation in step S8, and then calculates the degree of importance of the duplicate reservation in step S9. A calculation of the degree of importance of the duplicate reservation is executed for all of the reservations made in the allowable date range described in the requirements of the reservation. The degrees of importance of steps S8 and S9 are calculated using the calculation method and the coefficients shown in FIG. 3, by referencing each of the tables shown in FIGS. 4, 5, and 6.

For example, the requirements of the reservation shown in FIG. 7 are entered on January 20th, and the degree of importance of the reservation is calculated as follows. The calculation date in this case is January 20th.

Firstly, the degree of importance according to (a) of FIG. 3 is obtained. The contents of the reservation shown in FIG. 7 include a character string "section meeting", which is registered in the keyword table shown in FIG. 4 as a keyword. Since other keywords are not included in the contents of the reservation, the value "10" of the degree of importance of the "section meeting" is the degree of importance according to (a) of FIG. 3.

Secondly, the degree of importance according to (b) of FIG. 3 is obtained. Judging from the allowable date range shown in FIG. 7, the execution date is determined to be January 24th. Accordingly, the number of days from and including the calculation date till the execution date is obtained as follows:

$$24-20+1=5$$

As a result, the degree of importance according to (b) of FIG. 3 is calculated as follows:

$$1/5=0.2$$

Next, the degree of importance according to (c) of FIG. 3 is obtained. The only key person shown in FIG. 7 is Ejima, and his managerial position is the section chief according to the individual information table shown in FIG. 5. Then, according to the conversion table of managerial positions/degrees of importance shown in FIG. 6, the degree of importance corresponding to the section chief is obtained as 5. As a result, the importance degree according to (c) of FIG. 3 is 5.

Then, the degree of importance according to (d) of FIG. 3 is obtained. The attendees shown in FIG. 7 include the section chief Ejima, Mochizuki, who is not assigned a managerial position, and 30 other staff who are not assigned managerial positions. That is, one section chief and 31 staff who are not assigned managerial positions will attend the meeting. According to the conversion table of managerial positions/degrees of importance, the degree of importance of the section chief is 5, the degree of importance of the staff not assigned managerial positions (others) is 1. As a result, the degree of importance according to (d) of FIG. 3 is as follows:

$$5\times 1+1\times 31=36$$

Then, the degree of importance according to (e) of FIG. 3 is obtained. The number of reservation changes is not included in the entry items shown in FIG. 7. Since this reservation is still at the stage of a request, no change is made to this reservation, as a matter of course. As a result, the degree of importance according to (e) of FIG. 3 is 0.

Lastly, the degree of importance according to (f) of FIG. 3 is obtained. The reservation request date shown in FIG. 7 is January 20th, and the calculation date is also January 20th. Accordingly, the degree of importance according to (f) of FIG. 3 is obtained as follows:

$$20-20=0$$

As described above, each of the calculated degrees of importance (a) through (f) of FIG. 3 is multiplied by each of the coefficients shown in FIG. 3, so that the total degree of importance of the requirements of the reservation is calculated. As a result, the degree of importance of the requirements of the reservation shown in FIG. 7 can be obtained as follows:

$$\text{importance degree}=10\times1.0+0.2\times1.0+5\times0.6+36\times0.2+0\times0.1+0\times0.1=20.4$$

After the degree of importance of each duplicate reservation is calculated in a similar manner, whether or not there is a duplicate reservation whose degree of importance is lower than that of the requested reservation is determined in step S10. If the degree of importance of the requested reservation is the lowest, the requirements of the requested reservation are not accepted and the processing goes to step S11. In step S11, whether the reservation being processed is either a newly-requested reservation or a current reservation is determined. Since the reservation refused this time is the newly-requested reservation, a message describing that the reservation cannot be arranged is displayed on the CRT 14 in step S14, and the processing is terminated.

If the current reservation whose degree of importance is lower than that of the newly-requested reservation is included in duplicate reservations in step S10, the value 1 is added to the number of reservation changes made to the current reservation in step S15. Then, the current reservation is replaced with the reservation being processed in step S16. That is, on the date and time when the current reservation with a lower importance degree was arranged, the newly-requested reservation is arranged instead. Then, the current reservation removed from the reservation table as having the lower importance degree will be handled as the requirements of the next reservation to be processed.

In the step S3 and subsequent steps, whether or not the replaced reservation can be moved to a different date and time is determined. If a vacant date and time exists within the allowable date range of the current reservation, the vacant date and time is reserved as a new date and time for using the meeting room in step S4. Since the current reservation is changed (step S5, YES), the new date and time is informed to the person who made the current reservation and the attendees.

As informing methods, a method using an electronic mail system, a method of automatically transmitting faxes, a method of publicity using an electronic bulletin board, a method of automatic calls using a voice synthesis system, a method of mailing or circulating a printed notice, etc. may be used. The reservation management apparatus shown in FIG. 2 informs the terminals of the person who made the reservation and others, connected over a network, of the change.

Then the updated status, including the requirements of the reservation initially entered, is displayed on the CRT 14 in step S6, and the processing is terminated.

If there is no vacant time in step S3, a duplicate reservation that can be replaced is searched for according to the degrees of importance in a similar manner as in the newly-requested reservation in steps S8, S9, and S10. If there is no duplicate reservation whose degree of importance is lower than that of the reservation being processed, whether or not the reservation being processed is the newly-requested reservation is determined in step S11. Since the reservation is not the newly-requested reservation in this case, it is canceled as one that cannot be arranged in step S12. Then, in step S13, it is informed to the person who made the reservation and the attendees that the reservation is canceled. As the informing methods, methods similar to those used in step S7 are used. Since there is no changed reservation (step S5, NO), the updated reservation status is displayed on the CRT 14 in step S6, and the processing is terminated.

If the existence of a duplicate reservation with a lower degree of importance is determined in step S10, it is replaced with the reservation being processed (steps S15 and S16). The replaced reservation is recognized as a target to be processed, and the processing goes back to step S3. Thus, the duplicate reservations are automatically arranged in priority.

The reservation management method according to this invention can be applied to not only reservation management of facilities such as a meeting room, etc, and a personal schedule, but reservation management of queues waiting to be processed by computers. Next, the reservation management of queues waiting to be processed by computers will be explained below.

In this case, the priority order of the queue waiting to be processed is assumed to be reserved. Its priority is controlled by degrees of importance automatically computed according to the contents of the reservations. The degrees of importance of the reservations are calculated by totaling the information of the degrees of importance (a) through (c), (e), and (f) of FIG. 3 among the entry items shown in FIG. 3. At that time, the content of the reservation described in (a) of FIG. 3 is assumed to be the content or a purpose of the processing described by a computer user who requests a reservation to be processed, and the key person described in (c) of FIG. 3 is assumed to be the user. The degree of importance according to (b) of FIG. 3 is assumed to be the inverse number of the time from the time of calculating the degrees of importance till the time of executing the reservation processing. The degree of importance according to (f) of FIG. 3 is assumed to be a time difference between the time of the reservation request and the time of calculating the degrees of importance.

Figure 10:
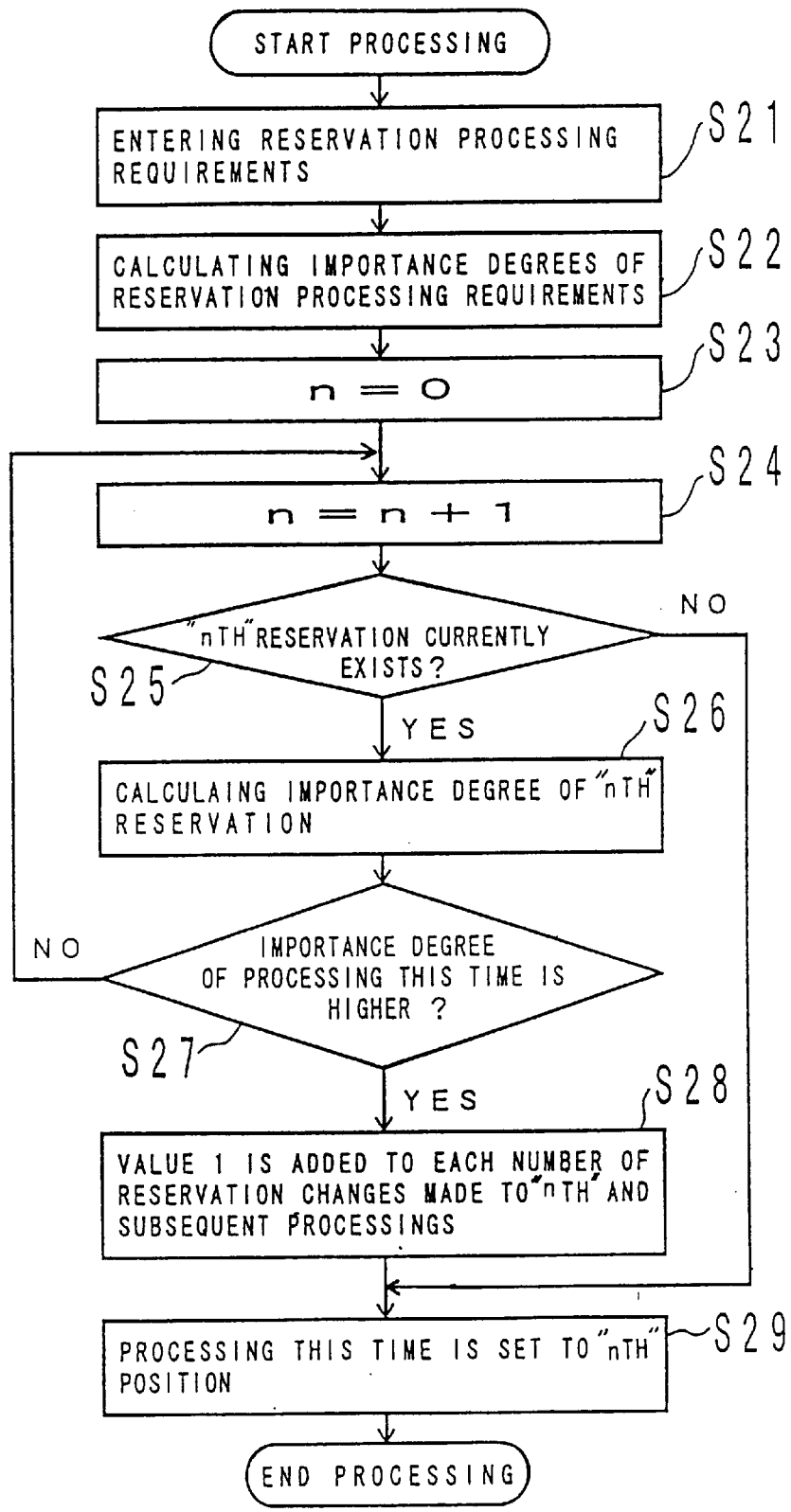
FIG. 10 is a flowchart showing a queue control processing.

FIG. 10 is a flowchart showing queue control processing performed by the reservation management apparatus in the embodiment according to the present invention. Once the processing is started, a user enters requirements of a reservation into the reservation management apparatus in step S21. At this time, items such as contents of the reservation (contents of the processing), an allowable reservation date range of the processing, a user name (the name of the person who requests a reservation), and a reservation request date are entered. Next in step S22, the CPU 11 calculates the total degree of importance of the reservation requirements in a similar manner as in FIG. 8. Each of the degrees of importance according to (a) through (c), (e), and (f) of FIG. 3 is multiplied by a corresponding predetermined coefficient. All of the multiplied values are added together and the result is defined as the degree of importance of the reservation.

Next in step S23, an initial value of a processing order "n" is set to 0, and the value 1 is added to "n" in step S24. Then, whether or not there is a processing waiting to be performed, which is reserved as an "nth" processing order, is determined in step S25. That is, it is determined whether or not there is the current reservation whose processing order is "n". Since "n" is 1 at first in step S24, whether or not there is a processing to be immediately performed is determined. If there is no processing waiting to be performed, the processing requested this time is registered as the "nth" processing in step S29, and the processing is terminated.

If there is the "nth" processing waiting to be performed in step S25, the degree of importance of that processing (reservation) is calculated in step S26. Then, whether or not the processing requested this time is more important than the nth processing is determined in step S27. The method of calculating the degree of importance of a current reservation is similar to that of the requirements of the reservation calculated in step S22. If the degree of importance of the processing (reservation) requested this time is higher, all the numbers of reservation changes made to the "nth" processing and subsequent processings are incremented by 1 in step S28. Then, the processing requested this time, which is handled as the new nth processing, is put into a queue waiting to be processed. The processing order of the nth processing and subsequent processings included in the queue waiting to be processed is incremented by 1.

If the degree of importance of the processing requested this time is lower in step S27, "n" is incremented in step S24, and the processing goes to step S25 after "n" is incremented in step S24. By repeating this processing, the processing requested this time is put into an appropriate location of the queue waiting to be processed. As described above, the queue waiting to be processed by a computer can be controlled in consideration of the degrees of importance of the processings.

What is claimed is:

1. A reservation management apparatus in an information processing system for receiving reservation requirements and determining whether to accept the reservation requirements, comprising:

entry means for entering requirements of a first reservation;

storage means for storing information of a second reservation that was previously registered and storing predetermined standards for determining degrees of importance;

detection means for determining whether there is a duplication between the first reservation and the second reservation, according to the information of the second reservation stored in said storage means and the requirements of the first reservation, when the requirements of the first reservation are entered;

importance degree determination means for calculating an importance degree of the first reservation according to the requirements of the first reservation, and an importance degree of the second reservation according to the information of the second reservation, by referring to the predetermined standards for determining degrees of importance stored in said storage means; and arrangement means for determining whether to accept the requirements of the first reservation, based on a comparison between the importance degree of the first reservation and the importance degree of the second reservation, which are calculated by said importance degree determination means, wherein the first reservation is accepted when the importance degree of the first reservation is greater than the importance degree of the second reservation.

2. The reservation management apparatus according to claim 1, wherein:

the reservation requirements are any of a schedule, or a date and time or a use order of resources used by a plurality of users.

3. The reservation management apparatus according to claim 1, the reservation management apparatus to interact with a computer, wherein:

said information processing system controls a processing order of a waiting queue to be processed by the computer;

said entry means enters requirements of a first processing as the requirements of the first reservation; and said storage means stores information of a second processing as the information of the second reservation.

4. The reservation management apparatus according to claim 1, further comprising:

output means f or outputting processing results in which said arrangement means has decided whether to accept the first reservation requirements.

5. The reservation management apparatus according to claim 1, wherein:

said storage means stores a keyword table including at least one keyword and an importance degree of the at least one keyword;

said detection means determines whether the at least one keyword matches the information of the first or second reservation; and said importance degree determination means calculates the importance degree of the first or second reservation using the importance degree of the at least one keyword, when said detection means determines that the at least one keyword is included in the requirements of the first reservation or the informnation of the second reservation.

6. The reservation management apparatus according to claim 1, wherein:

said storage means stores an individual information table where at least one user is registered;

said detection means calculates an importance degree of a first user related to the first reservation and of a second user related to the second reservation, by referring to the individual information table; and said importance degree determination means calculates the importance degree of the first or the second reservation, according to the importance degree of the first user or the second user for every entry of the first or second reservation.

7. The reservation management apparatus according to claim 1, wherein, said importance degree determination means calculates the importance degree of the first or the second reservation, using at least one of a date and time in an allowable reservation date range, a number of reservation changes, and a date and time of requesting the reservation.

8. The reservation management apparatus according to claim 1, wherein:

said importance degree determination means calculates an importance degree for each of a plurality of items related to the first or the second reservation, sums up a plurality of results obtained by multiplying each importance degree of the plurality of items by each of appropriate coefficients, and calculates the importance degree of the first or the second reservation.

9. The reservation management apparatus according to claim 1, wherein, said arrangement means decides a priority order of the first and second reservation by making the comparison between the importance degree of the first reservation and the importance degree of the second reservation, and removes a duplication by changing the second reservation or the first reservation depending on the respective priority order of the first and second reservation.

10. The reservation management apparatus according to claim 1, wherein, said arrangement means does not schedule the first reservation if the importance degree of the first reservation is lower than the importance degree of the second reservation.

11. The reservation management apparatus according to claim 1, wherein, said arrangement means schedules the first reservation if the importance degree of the first reservation is higher than the importance degree of the second reservation.

12. The reservation management apparatus according to claim 11, wherein:

said arrangement means removes the duplication by changing or canceling the second reservation.

13. The reservation management apparatus according to claim 12, further comprising:

output means for informing a user related to the second reservation of the duplication, when said arrangement means changes or cancels the second reservation.

14. A reservation management method in an information processing system comprising the steps of:

entering requirements of a first reservation;

determining whether there is a duplication between a first reservation and a second reservation, according to the requirements of the first reservation and information of the second reservation that was previously registered;

calculating an importance degree of the first reservation according to the requirements of the first reservation, and an importance degree of the second reservation according to the information of the second reservation, by referring to predetermined standards for determining degrees of importance; and determining whether to accept the first reservation by comparing the importance degree of the first reservation and the importance degree of the second reservation, wherein the first reservation is accepted when the importance degree of the first reservation is greater than the importance degree of the second reservation.

* * * * *